Patented Dec. 19, 1939

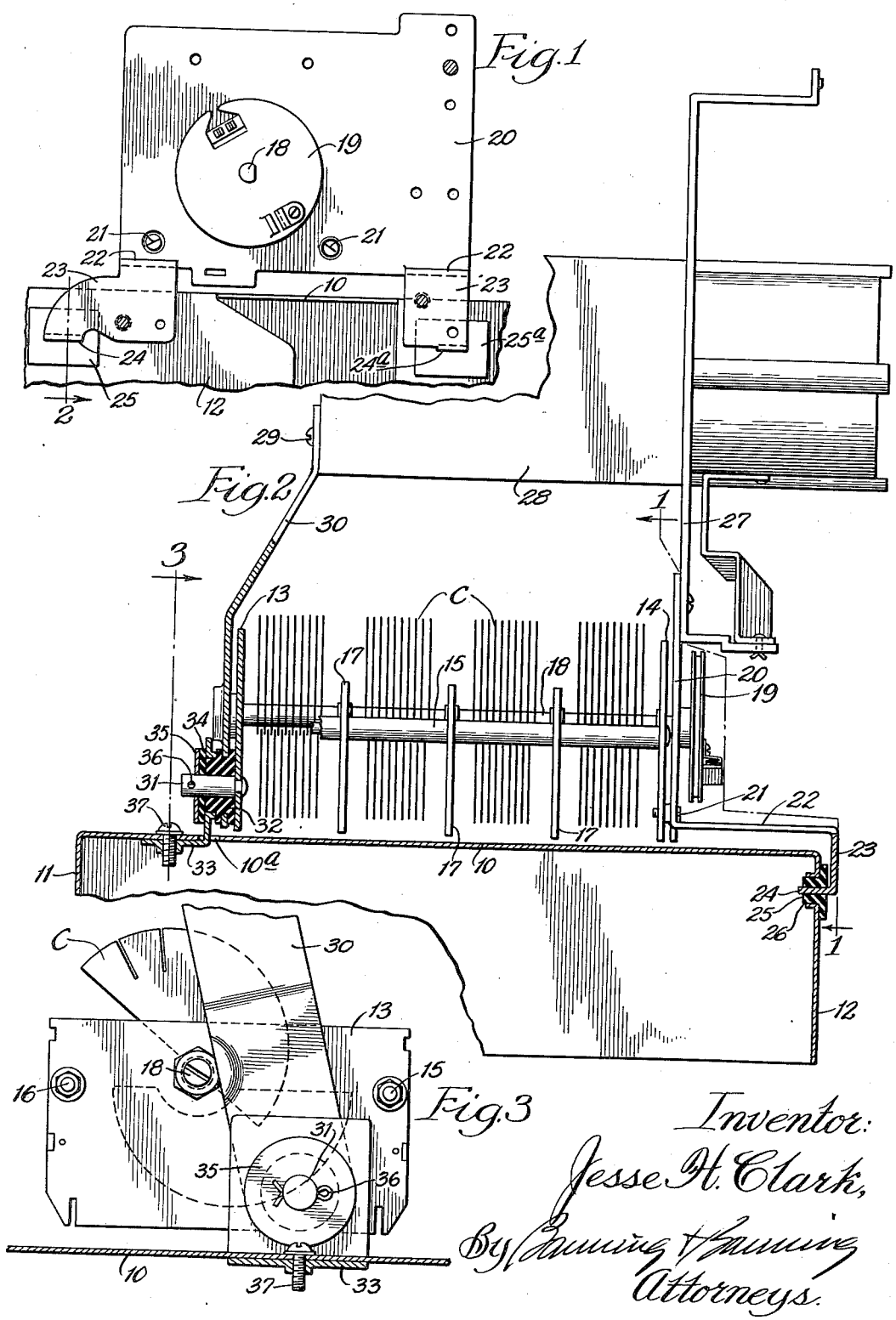

2,183,985

UNITED STATES PATENT OFFICE 2,183,985

MOUNTING FOR RADIO CONDENSERS

Jesse H. Clark, Chicago, Ill., assignor to Wells-Gardner & Company, Chicago, Ill., a corporation of Illinois Application October 4, 1937, Serial No. 167,225

6 Claims. (Cl. 248—358)

An object of this invention is to provide a mounting for condensers and their associated parts which will relieve the condensers, particularly gang condensers, of strains and which will prevent microphonics. By thus relieving strains in the condensers their capacities become more nearly uniform throughout their range of adjustment so that greater accuracy in tuning is possible.

Another object is to provide a mounting for a gang condenser and its operative parts on a frame which will make a convenient assembly unit.

Another object is to provide means for quickly and efficiently assembling such a unit on the chassis frame of a radio receiving set.

These and other objects, as will hereinafter appear, are accomplished by this invention which is fully described in the following specification and shown in the accompanying drawing, in which:

Fig. 1 is a partial front elevation of the chassis and condenser mounting as viewed on the broken line 1—1 of Fig. 2;

Fig. 2 is a partial vertical section on the line 2 of Fig. 1; and

Fig. 3 is a partial vertical section on the line 3 of Fig. 2.

The embodiment illustrated comprises a radio chassis preferably consisting of sheet metal pressed to form a top 10 and sides 11, 12 upon which it is desired to mount a gang condenser C. This condenser has a frame consisting of end plates 13, 14 which are tied together by side rods 15, 16 with spacers 17 between the several condenser units, these spacers being carried by the side rods.

A shaft 18 is suitably journaled in the end plates 13, 14 and carries a drive member 19 by means of which it is rotated. This driving means forms no part of the present invention, hence will not be described in detail.

The condenser frame is connected at the right hand in Fig. 2 to a plate 20 by means of two spaced screws 21, the shaft 18 passing through an enlarged opening in the plate 20 without touching it.

The plate 20 has a forward extension 22, a downturned portion 23 and a rearwardly extending tongue 24, the latter being surrounded by a rubber pad or grommet 25 which is placed in a suitable opening 26 in the side 12 of the chassis.

The upper portion of the plate 20 is secured to a casting 27 to which is suitably attached a housing 28, the two constituting a main frame, the opposite ends of the housing being secured by means of screws 29 to a bent support 30.

The end plate 13 of the condenser carries a pin 31 which extends through an opening in the support 30 but which is suitably insulated therefrom by means of a rubber pad 32. An L-shaped lug 33 has an opening into which is inserted a portion of the rubber pad 32, said pad also having an annular ridge which separates the lug from the support 30. Outside the lug is preferably placed a rubber washer 34 and outside this is a metal washer 35 which is retained in place by means of a cotter pin 36.

The lower end of the L-shaped lug 33 extends through an opening 10ᵃ in the top 10 and has a threaded opening into which is screwed a screw 37. The several parts less the chassis 10, 11, 12 and the screw 37 will assemble as a unit which makes a convenient unit for production as a shop assembly. To assemble this unit on the chassis, the two spaced tongues 24, 24ᵃ of Fig. 1 are placed in the rubber pads 25, 25ᵃ and these inserted in the openings previously formed in the side of the chassis and pressed to the left. At the same time the rubber pad or grommet 32 is inserted into the upper portion of the L-shaped lug 33 after which the screw 37 is inserted and tightened.

While pressing the condenser assembly to the left, the washers 34 and 35 are placed over the pin 31 and the cotter pin 36 is inserted and its ends spread so that it cannot readily be removed. It will be seen that this form of mounting places substantially no torsional strain on the condenser unit C no matter how much the chassis frame may be warped or twisted.

It will also be seen that the rubber pads provide a yieldable connection between the condenser frame and chassis so that vibrations received by the chassis will be greatly reduced if not substantially suppressed by the time they reach the condenser. Thus microphonic noises generated outside will not be transmitted to the condenser to be heard in the set. Likewise any noises originating in the condenser due to turning it when it is being operated will not be transmitted to the chassis frame, and hence to the radio tubes (not shown) comprising the receiving set.

The arrangement of three rubber pads for supporting the gang condenser frame and its associated parts provides sidewise or lateral stability by the horizontal rubber pads 25, 25ᵃ on the front of the chassis with freedom from torsional strain because of the pin 31 which is free to turn in the grommet 32. It will also be noted that the condenser drive member 19 is placed adjacent the horizontal pads so that the condenser body is firmly but yieldingly held while a turning effort is applied to the condenser shaft.

While I have shown and described but a single embodiment of this invention, it is to be understood that it is capable of many modifications. Changes, therefore, in the construction and arrangement may be made which do not depart from the spirit and scope of the invention as described in the appended claims.

I claim:

1. In combination, a radio chassis having top and side portions, a gang condenser frame, three and only three points of attachment between the condenser frame and chassis, two of said points of attachment being on the side portion, rubber pads at the three points of attachment between the frame and chassis, the other point of attachment being at the top and comprising a lug having an opening in which lies one of the rubber pads, a pin carried by the condenser frame and extending through the last mentioned rubber pad, and means for attaching the lug to the top portion of the chassis whereby the condenser frame has lateral stability provided by the horizontal rubber pads on the side of the chassis and freedom from torsion due to the pin at the top.

2. In combination, a radio chassis having top and side portions, a gang condenser frame, three and only three points of attachment between the condenser frame and chassis, two of said points of attachment being on the side portion, rubber pads at the three points of attachment between the frame and chassis, the other point of attachment being at the top and comprising a pin lying substantially parallel to the top and extending through the rubber pad whereby the condenser frame has lateral stability provided by the horizontal rubber pads on the side of the chassis and freedom from torsion due to the pin at the top.

3. In combination, a radio chassis having top and side portions, a gang condenser frame, three and only three points of attachment between the condenser frame and chassis, rubber pads at the three points of attachment of the frame and chassis, two of said points of attachment being on the side portion and having tongues extending into two of the rubber pads, the attachment at the top comprising an L-shaped lug having an opening at one side surrounding the other rubber pad, the other side of the lug extending through an opening in the top of the chassis, and a screw securing the other side of the lug to the top whereby the condenser frame can be released from the chassis by the removal of one screw.

4. In combination, a radio chassis having top and side portions substantially at right angles to each other, a gang condenser frame, two spaced rubber pads in openings in one side portion of the chassis, tongues carried by the condenser frame and extending into openings in the rubber pads, a third rubber pad secured to the top portion of the chassis, and means carried by the condenser frame for engaging the third rubber pad to hold the tongues in the first-mentioned rubber pads thereby positioning the condenser frame on the chassis.

5. In combination, a radio chassis having top and side portions substantially at right angles to each other, a gang condenser frame, two spaced rubber pads in openings in one side portion of the chassis, tongues carried by the condenser frame and extending into openings in the rubber pads, a third rubber pad secured to the top portion of the chassis, and means including a pin extending parallel to the top portion and carried by the condenser frame for engaging the third rubber pad to hold the tongues in the first-mentioned rubber pads whereby the condenser is free from torsion and the whole may be readily assembled or disassembled.

6. In combination, a radio chassis having top and side portions substantially at right angles, a main frame, two spaced rubber pads in openings in the side portion of the chassis, tongues carried by the main frame and extending into openings in the rubber pads, a third rubber pad secured to the top portion, means carried by the main frame and engaging the third rubber pad so as to be flexibly secured thereon, and a condenser having a frame secured at one end to the main frame and at the other end having a pin extending into the third rubber pad and lying parallel to the axis of the condenser shaft whereby both the condenser and the main frame will be free from torsion and both are mounted in rubber.

JESSE H. CLARK.